United States Patent
Elrufaie et al.

(10) Patent No.: US 10,904,357 B1
(45) Date of Patent: Jan. 26, 2021

(54) OPTIMIZING REQUEST DISPATCHING BETWEEN SERVICES

(71) Applicant: INTUIT INC., Mountain View, CA (US)

(72) Inventors: Elharith Elrufaie, Mountain View, CA (US); Xuan Zhou, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 287 days.

(21) Appl. No.: 15/923,931

(22) Filed: Mar. 16, 2018

(51) Int. Cl.
*H04L 29/08* (2006.01)
*H04L 12/24* (2006.01)
*G06F 16/951* (2019.01)

(52) U.S. Cl.
CPC .......... *H04L 67/32* (2013.01); *H04L 41/0273* (2013.01); *H04L 67/02* (2013.01); *G06F 16/951* (2019.01)

(58) Field of Classification Search
CPC ... G06F 16/951; H04L 41/0273; H04L 67/02; H04L 67/32
See application file for complete search history.

(56) References Cited

U.S. PATENT DOCUMENTS

| | | | |
|---|---|---|---|
| 2003/0023607 A1* | 1/2003 | Phelan | G06Q 40/06 |
| 2007/0168324 A1* | 7/2007 | Grabs | G06F 16/24542 |
| 2009/0248631 A1* | 10/2009 | Alba | G06F 16/2457 |
| 2009/0285399 A1* | 11/2009 | Schneider | H04L 63/0428 380/278 |
| 2013/0007847 A1* | 1/2013 | Plattner | G06Q 10/08 726/4 |
| 2014/0195558 A1* | 7/2014 | Murthy | G06F 16/2358 707/770 |
| 2017/0344605 A1* | 11/2017 | Wells | G06F 16/2453 |
| 2018/0060365 A1* | 3/2018 | Mujumdar | G06F 21/6218 |
| 2019/0353910 A1* | 11/2019 | Gwalani | G02B 27/0176 |

* cited by examiner

*Primary Examiner* — Jerry B Dennison
(74) *Attorney, Agent, or Firm* — Patterson + Sheridan, LLP

(57) ABSTRACT

Certain aspects of the present disclosure provide techniques for requesting data in a distributed system. Embodiments include receiving a query from an application running on a client device. Embodiments further include generating a plurality of subqueries based on the query, each subquery corresponding to an entity of the plurality of entities that is requested in the query. Embodiments further include determining that a group of subqueries of the plurality of subqueries corresponds to particular entities that are provided by particular providers of the plurality of providers that are included within a single service. Embodiments further include sending a batch request to the single service, the batch request comprising the group of subqueries. Embodiments further include receiving the particular entities from the single service in response to the batch request and providing the particular entities to the application in response to the query.

21 Claims, 7 Drawing Sheets

OPTIMIZING REQUEST DISPATCHING BETWEEN SERVICES

INTRODUCTION

Aspects of the present disclosure generally relate to request dispatching between services. In particular, embodiments of the present disclosure involve grouping requests that can be served by a single service into a batch request to the single service.

BACKGROUND

Application programming interfaces (APIs) generally expose various routines and methods to software developers for use in obtaining and modifying data using features of a software application. These APIs may be accessible programmatically (e.g., as function calls programmed in an application or function library) or via a web resource for web-based applications. Applications (e.g., web based applications, mobile applications, and other types of applications) can invoke functionality exposed by an API, for example, using a Representational State Transfer function call (a RESTful function call), queries encapsulated in an HTTP POST request, a Simple Object Access Protocol (SOAP) request, or other protocols that allow client software to invoke functions on a remote system.

In some software systems, such as distributed systems, source code of an application may invoke functionality exposed by APIs to retrieve data (e.g., in the form of an HTTP request) from a plurality of different providers, such as services that store and provide data. In some cases, authorization may be performed by a provider and/or by a proxy device to verify that an application is authorized to access a provider (e.g., to retrieve data from that provider). As the number of providers and the amount of data grows, existing techniques may become inefficient. For example, repeated requests to certain providers may place a heavy load on processing and communication resources within the system, and may result in latency and bottlenecks. As such, there is a need for techniques that optimize request dispatching between applications and providers.

BRIEF SUMMARY

Certain embodiments provide a computer-implemented method for requesting data in a distributed system. The method generally includes receiving a query from an application running on a client device. The method further includes generating a plurality of subqueries based on the query, wherein each subquery corresponds to an entity of the plurality of entities that is requested in the query. The method further includes determining that a group of subqueries of the plurality of subqueries corresponds to particular entities that are provided by particular providers of the plurality of providers that are included in a single service. The method further includes sending a batch request to the single service, wherein the batch request comprises the group of subqueries. The method further includes receiving the particular entities from the single service in response to the batch request and providing the particular entities to the application in response to the query.

Other embodiments provide a system comprising a processor and a non-transitory computer-readable medium storing instructions that, when executed by the processor, cause the processor to perform an operation for requesting data in a distributed system. The operation generally includes receiving a query from an application running on a client device. The operation further includes generating a plurality of subqueries based on the query, wherein each subquery corresponds to an entity of the plurality of entities that is requested in the query. The operation further includes determining that a group of subqueries of the plurality of subqueries corresponds to particular entities that are provided by particular providers of the plurality of providers that are included in a single service. The operation further includes sending a batch request to the single service, wherein the batch request comprises the group of subqueries. The operation further includes receiving the particular entities from the single service in response to the batch request and providing the particular entities to the application in response to the query.

Other embodiments provide a non-transitory computer-readable medium storing instructions that, when executed by the processor, cause the processor to perform an operation for requesting data in a distributed system. The operation generally includes receiving a query from an application running on a client device. The operation further includes generating a plurality of subqueries based on the query, wherein each subquery corresponds to an entity of the plurality of entities that is requested in the query. The operation further includes determining that a group of subqueries of the plurality of subqueries corresponds to particular entities that are provided by particular providers of the plurality of providers that are included in a single service. The operation further includes sending a batch request to the single service, wherein the batch request comprises the group of subqueries. The operation further includes receiving the particular entities from the single service in response to the batch request and providing the particular entities to the application in response to the query.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
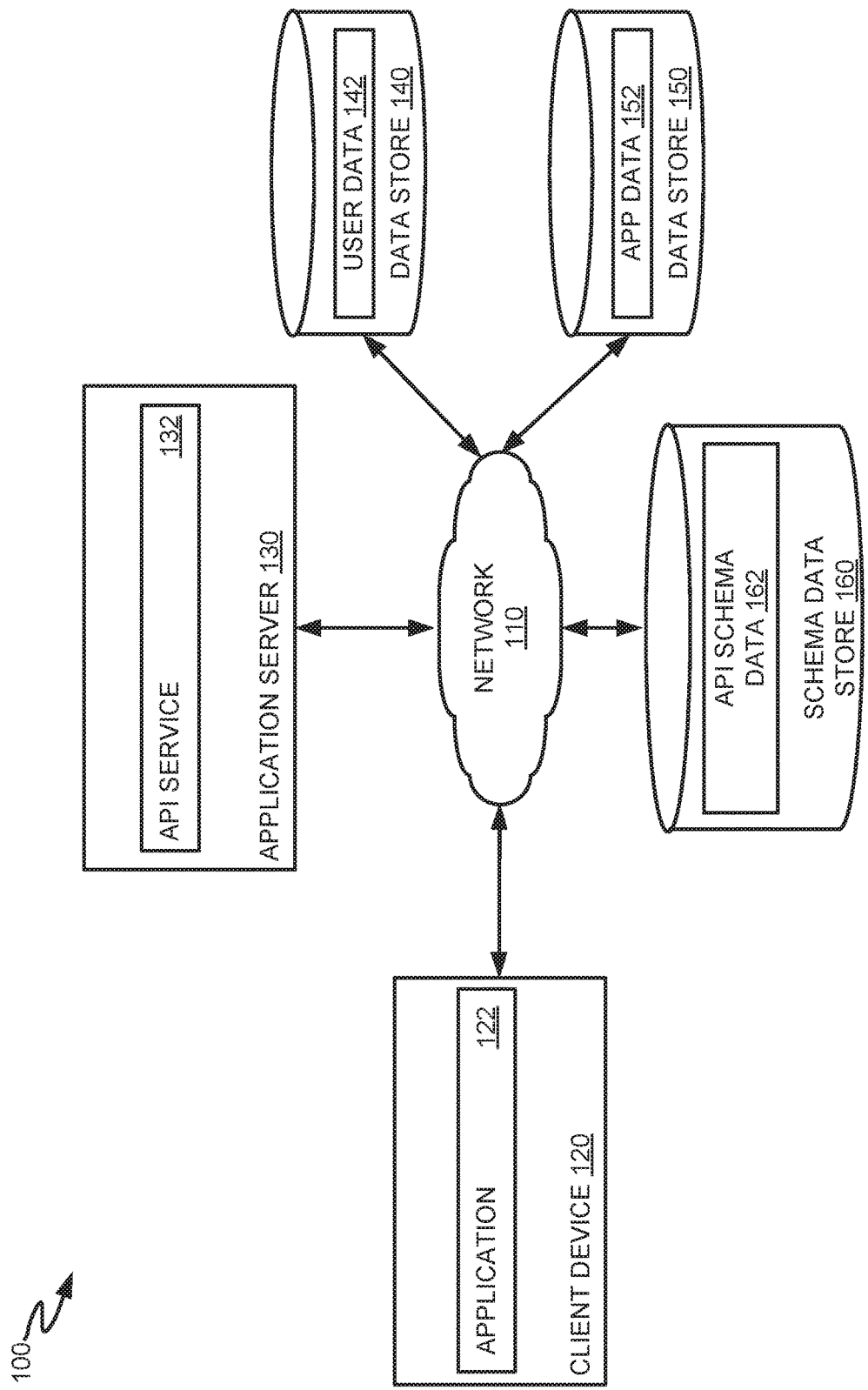
FIG. 1 depicts an example computing environment in which embodiments of the present disclosure may be implemented.

Aspects of the present disclosure provide apparatuses, methods, processing systems, and computer readable mediums for request dispatching between services.

The following description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

In certain embodiments, an application on a client device may request entities, such as items of data, from one or more providers, such as services that provide data (e.g., databases), through calls to an Application Programming Interface (API). APIs generally expose methods and procedures that software developers can use to build software applications using features provided by a software system. These features may include, for example, database interaction, data processing, and so on. APIs generally define a set of inputs for an application to provide for processing and a set of outputs generated by the application in response to the inputs. When an application invokes an API function call to retrieve data, for example for display to a user, the API function call may comprise a query for a plurality of entities provided by one or more providers, and may be directed to an application server. The application server receives the query and breaks the query into subqueries, wherein each subquery corresponds to a different entity requested in the query. The application server may have access to mapping information that identifies providers associated with each entity. For example, the mapping information may be stored at the application server or may be maintained remotely, such as in a data store. In some embodiments, the application server accesses the mapping information and analyzes it to identify one or more providers for each subquery. In certain embodiments, the mapping information is maintained within a graph representation of the API, which comprises schema definitions that represent functions exposed by the API (e.g., to request or write data to a data store, analyze data in a data store, and so on).

In some cases, a plurality of subqueries may correspond to the same provider. Rather than sending each subquery separately, embodiments of the present disclosure involve grouping subqueries into batch requests based on providers in order to reduce resource usage and thereby improve the functioning of the system. For example, the application server may group all subqueries that correspond to a particular provider into a batch request and send the batch request to the provider so that each of the subqueries does not have to be separately sent to and processed by the provider. Batch requests may, for example, be dispatched as HTTP requests to providers. In certain embodiments, the application server use one or more container threads to dispatch batch requests. For example, each batch request may be dispatched by a separate container thread that is launched by the application server. In some embodiments, container threads are used to receive and handle queries from client devices as well. A container thread generally refers to a processing thread that is dedicated to processing and dispatching requests, such as HTTP requests, from clients. In some embodiments, a plurality of providers may be part of a single service (e.g., the providers may be implemented within the same service). In such cases, requests may be batched such that a single batch request is sent to a service that includes a plurality of providers corresponding to requested entities.

In some cases, authorization may be performed by the application server before each request is dispatched to a provider. For example, the application server may verify that the application from which the query was received is authorized to access the provider to which the request is being dispatched. Authorization may be performed based on a number of different techniques, such as a certificate included with the query from the application that identifies the client device, application, or user, as well as the providers that the client device, application, or user is authorized to access or the aspects of the API that the client device, application, or user is authorized to use. In another embodiment, the application may provide login credentials to the application server in order to establish an authenticated session, and authorization may be based on the authenticated session. In another embodiment, authorization may be based on permission information accessible by the application server, such as in a local or remote database. In some embodiments, providers may also authenticate requests upon receiving requests, based on techniques such as certificates included with the requests, authenticated sessions (e.g., established between the application server and a client device), or based on permission information accessible by the providers (e.g., based on user credentials included with the requests). Grouping subqueries into batch requests based on providers improves resource efficiency of the system, for example, by reducing the number of authorization operations performed by the application server, and, in some embodiments, also by the providers. By reducing the number of authorization operations, computing resources (e.g., processing bandwidth and memory usage) or saved for actually providing resources to requesters. Because a batch request is dispatched to a provider as a single request regardless of how many entities are requested from the provider within the batch request, it is only authorized once by the application server and, in some embodiments, once by the provider.

While descriptions herein primarily relate to read requests (e.g., retrieving data from a provider), it is understood that techniques described herein may also be applied to write requests. For example, write requests may also be grouped into batch requests based on providers. In certain embodiments, some providers may comprise services. API functions may invoke functionality that is provided by different services, such as database services related to particular types of data. For example, different attributes needed by an application to populate an invoice may be maintained by different database services. The application may send a query for all of the attributes of the invoice to the application server, and the application server may break the query into a plurality of subqueries, each subquery corresponding to a different attribute of the invoice. The application server may then group the subqueries into batch requests based on microservices that provide the attributes, such that all subqueries directed to a particular service are sent in a single batch request.

Providers may, for example, respond to batch requests with the entities (e.g., data) that were requested in the batch requests. Upon receiving responses to all batch requests, the application server aggregates all of the responses from the providers and provides the aggregated responses to the application on the client device in response to the query. The application may then use the aggregated responses in processing. For example, if the query was related to an invoice, the application may populate the invoice with attributes retrieved from the providers.

Techniques described herein constitute an improvement in conventional industry practice, as they allow for the optimization of request dispatching and response aggregation. Grouping requests into batch requests based on providers reduces usage of computing resources such as processing and networking resources (e.g., threads that dispatch and handle requests over HTTP connections) at both the application server and the provider to which a request is dispatched. Furthermore, batching requests according to techniques described herein avoids redundant authorization of requests by the application server and/or the providers to which requests are dispatched and thereby further reduces the load on system resources. As such, embodiments of the present disclosure reduce latency and improve the functioning of systems in which requests are dispatched, received, and processed as compared to conventional industry practices. Techniques described herein allow for increased scalability of applications (e.g., due to the increased availability of computing resources), allowing for the handling of larger amounts of traffic without adding additional computing resources, thereby saving costs. Consumers of an API implemented according to embodiments of the present disclosure will experience increased performance due to the efficiencies described herein.

Example Computing Environment

FIG. 1 depicts an example computing environment 100 in which embodiments of the present disclosure may be implemented.

Computing environment 100 comprises a client device 120, an application server 130, data stores 140 and 150, and a schema data store 160, all of which are connected by a network 110 (e.g., the Internet). Client device 120 may be a physical or virtual computing device, such as a desktop computer, laptop computer, portable electronic device, smart device, internet of things (IoT) device, or the like. As depicted, client device 120 comprises an application 122. Application 122 may, for example, comprise a client-side component of a client-server application, such as a web application, and may invoke functionality exposed by an API in order to read and write data to and from providers, such as services. In some embodiments, application 122 may include a user interface that allows users to interact with data and services provided via application server 130. In an example, application 122 allows a user to select data that the user wishes to view. Based on the selections received, application 122 generates and transmits a query to application server 130 for the selected data. The selected data may, for example, comprise entities (e.g., attributes for populating a document, such as an invoice) that are provided by providers, such as data stores 140 and 150 (which may, for example, comprise database services).

Application server 130 may be a physical or virtual computing device, such as a server, desktop computer, laptop computer, or the like. As depicted, application server 130 comprises an API service 132, which may perform operations related to optimizing request dispatching according to techniques described herein. In one example, API service 132 receives a query from application 122 for a plurality of entities. API service 132 breaks the query into a plurality of subqueries, each subquery corresponding to a single entity of the plurality of entities. API service 132 then determines a provider for each subquery by accessing and analyzing mapping information that identifies mappings between entities and providers (e.g., stored locally on application server 130 or in schema data store 160). After determining providers for each subquery, API service 132 groups subqueries into batch requests based on providers, such that all subqueries corresponding to a single provider are included in a single batch request to the single provider. For example, all subqueries corresponding to data store 140 (e.g., requests for user data 142) will be included in a batch request to data store 140, and all subqueries corresponding to data store 150 (e.g., requests for app data 152) will be included in a batch request to data store 150. Batch requests may, for example, be dispatched to providers (such as data stores 140 and 150) via one or more container threads (e.g., processing threads that are dedicated to processing and dispatching HTTP requests).

API service 132 may, in some embodiments, authorize each batch request before it is dispatched to a provider. For example, API service 132 may analyze a certificate included by application 122 within the query that identifies client device 120 and lists the providers or entities which client device 120 is authorized to access. In another example, API service 132 may authorize a batch request based on an authenticated session established between client device 120 and application server 130 using login credentials (e.g., entered by a user via a user interface associated with application 122). If API service 132 determines that a request (e.g., a batch request) is not authorized, it will not dispatch the request, and may return an error message to application 122 indicating that the request was not completed. When a request (e.g., a batch request) is authorized, API service 132 dispatches the request to the applicable provider. In certain embodiments, providers also perform authentication of requests upon receipt.

Data stores 140 and 150 may comprise data storage entities, such as repository or database services that provide data related to application 122 over network 110. For example, data stores 140 and 150 may be database service "providers". Data store 140 comprises user data 142, which may comprise data related to one or more users of application 122. User data 142 may include, for example, user preferences, user profile data, user credentials, user clickstream data, application state data for particular users, and the like. Data store 150 comprises app data 152, which may comprise data related to application 122, such as application settings, application state data, application content, and the like. In certain embodiments, a user of application 122 requests items of user data 142 (e.g., user profile data) and app data 152 (e.g., application content) through interaction with a user interface associated with application 122 (e.g., by clicking on a link to view the user's profile or another application screen), and application 122 requests the items of user data 142 and/or app data 152 in a query to application server 130. According to techniques described herein, if a query from application 122 includes a plurality of requests directed to data store 140, application server 130 may group the plurality of requests into a batch request to data store 140. Similarly, if a query from application 122 includes a plurality of requests directed to data store 150, application server 130 may group the plurality of requests into a batch request to data store 150.

In certain embodiments, data stores 140 and 150 may perform authentication of requests received from application server 130. For example, data store 140 or data store 150 may authenticate a request from application server 130 based on a certificate included in the request, based on an authenticated session (e.g., established between application 122 and data store 140 or 150), based on user credentials included with the request (e.g., entered by a user via a user interface of application 122), or the like. If a request is not authenticated, data store 140 or 150 may respond to the request with an indication that the request was not authenticated. If a request is authenticated, data store 140 or 150 may provide the requested items of data in response to the request.

Schema data store 160 generally is a repository or other data storage entity for storing schema definition files for each function, or query, available in an API. As illustrated, schema data store 160 includes API schema data 162. API schema data 162 may define one or more functions provided by the API. In some cases, schema data store 160 may also store a graph projection of the API, including extensions added to the API by various developers. In certain embodiments, schema data store 160 includes mapping information that maps entities to providers. For example, the mapping information may associate each entity (e.g., items of user data 142 and app data 152) that may be requested through the API with one or more providers that provide the entity (e.g., data stores 140 and 150). In some embodiments, application server 130 accesses the mapping information on schema data store 160 to identify providers that are associated with each entity that is requested in a query received from application 122, and uses this information to group requests into batch requests based on providers.

While certain functions are described with respect to particular components depicted in FIG. 1, it is noted that other arrangements are possible. Furthermore, certain components may alternatively be implemented as a plurality of local or remote components. For example, the functionality of application server 130 may be distributed across a plurality of computing devices.

Figure 2A:
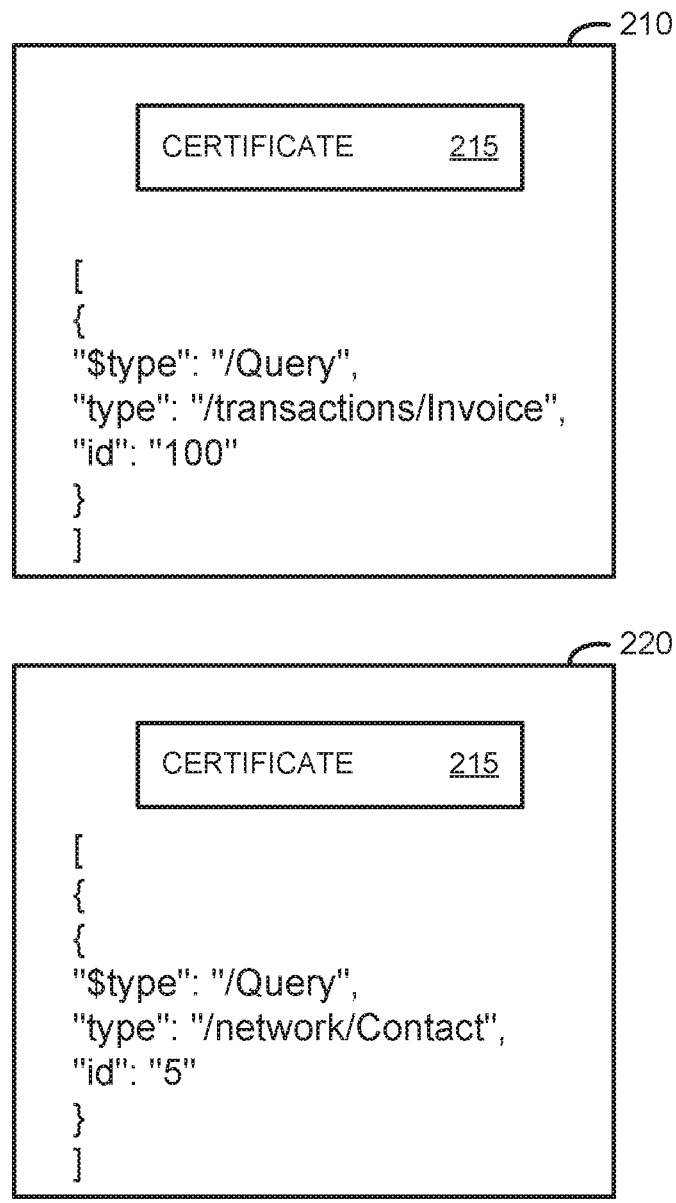
FIGS. 2A and 2B depict an example of requests before and after batching according to techniques described herein.
Figure 2B:
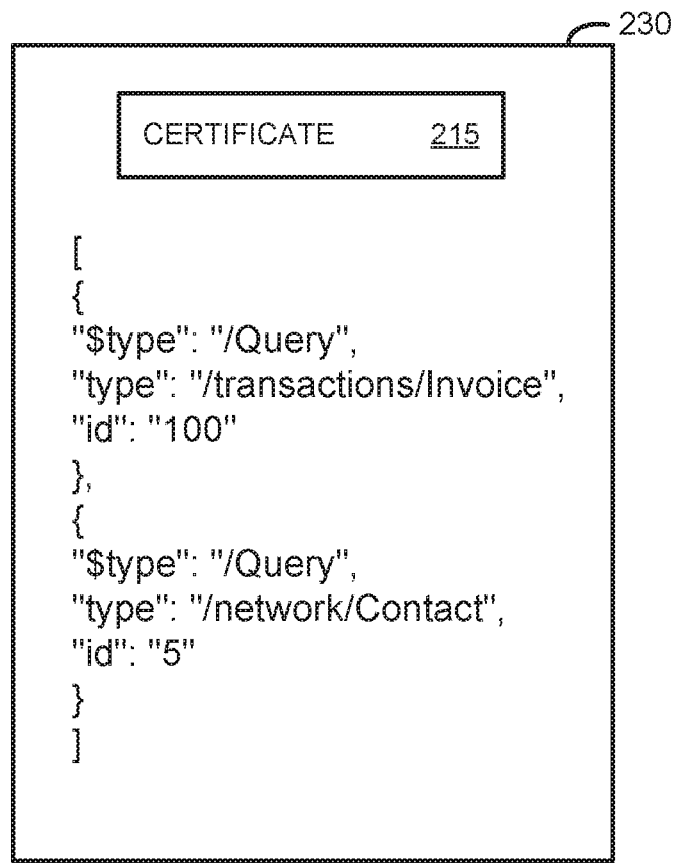

FIGS. 2A and 2B depict an example of requests before and after batching according to techniques described herein.

FIG. 2A illustrates requests 210 and 220, which may comprise separate requests included in a query received by an application server (such as application server 130 in FIG. 1). For example, a user of an application running on a client device may request to view certain items of data (e.g., those associated with the IDs "100" and "5"), and the application may submit a query comprising requests 210 and 220 to the application server. The application server may break the query into a first subquery comprising request 210 and a second subquery comprising request 220. Each of requests 210 and 220 may include a certificate 215 received from the application in the query, which may, for example, identify the providers or entities that the user is authorized to access. The application server determines a provider that is associated with the entities requested in each of requests 210 and 220, such as by accessing mapping information stored locally or in a separate data store (e.g., schema data store 160 in FIG. 1).

FIG. 2B illustrates a batch request 230, which is generated based on requests 210 and 220 from FIG. 2A. For example, the application server may determine that the entities requested in both requests 210 and 220 are provided by the same provider, such as based on the IDs of the entities included in requests 210 and 220 (e.g., "100" and "5"). In some examples, the application server may make this determination based on mapping information, such as described above. Based on this determination, the application server groups requests 210 and 220 into a single batch request 230, which includes certificate 215. The application server may, in some embodiments, authorize the batch request (e.g., using certificate 215), and then dispatches the request to the provider (e.g., upon successful authorization). The provider may, in some embodiments, authorize the request upon receipt (e.g., using certificate 215), and then, upon successful authorization, responds with the requested entities.

It is noted that, while the example illustrated in FIGS. 2A and 2B is simple and involves only two requests being grouped into a batch request, techniques described herein produce significant performance gains when employed in systems with large numbers of requests. It is further noted that certificates are only included as one example of an authorization technique, and other techniques may be employed without departing from the scope of the present disclosure.

Example Computer-Implemented Method

Figure 3:
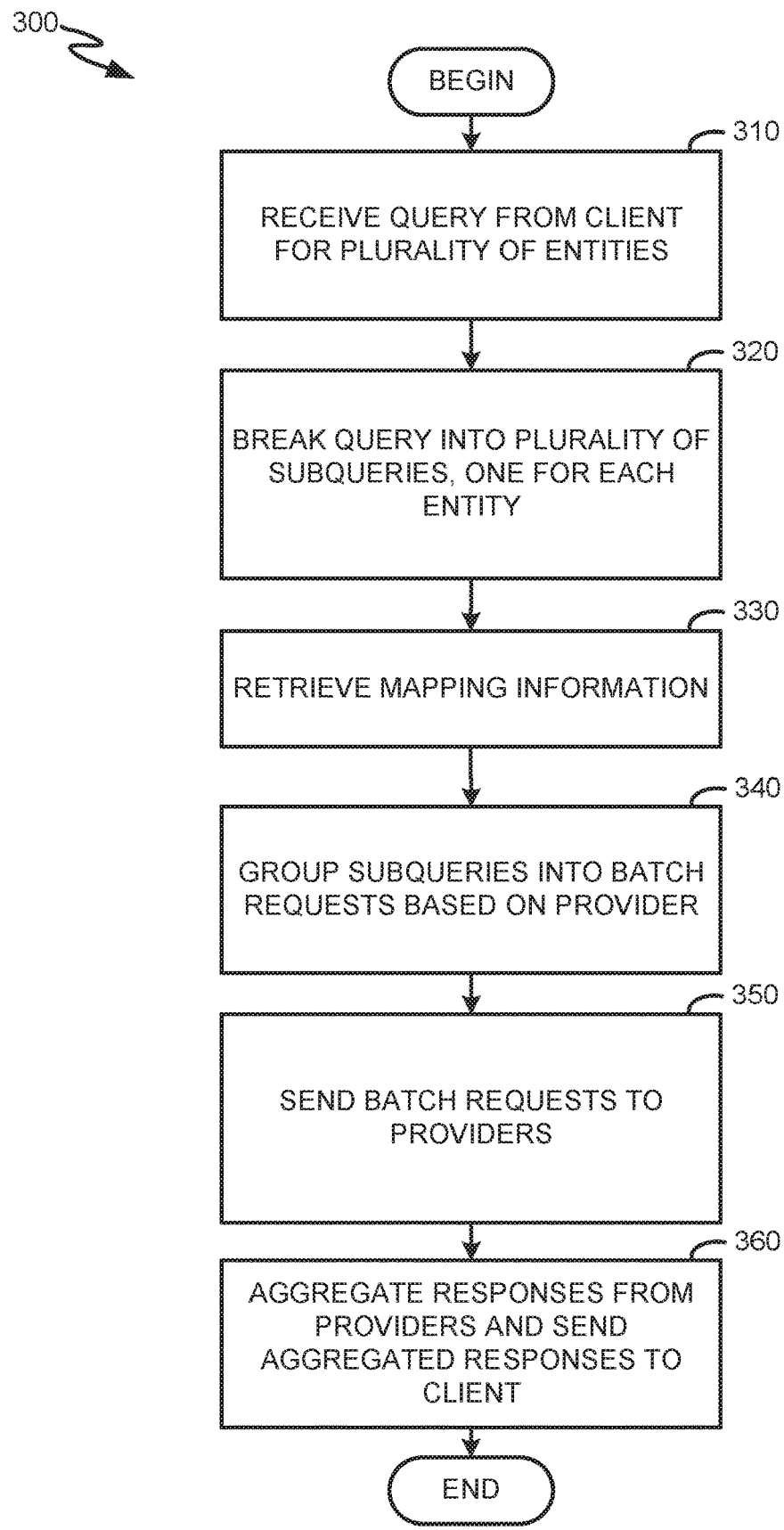
FIG. 3 depicts example operations for optimizing request dispatching.

FIG. 3 depicts example operations 300 for optimizing request dispatching. Operations 300 may, for example, be performed by application server 130 of FIG. 1.

Operations 300 begin at step 310, where a query is received from a client device, the query comprising a request for a plurality of entities. For example, the query may be sent by an application running on the client device in order to retrieve data related to the application for display within the application.

At step 320, the query is broken into a plurality of subqueries, each subquery corresponding to a different entity requested in the query.

At step 330, mapping information is retrieved that identifies associations between entities and providers. For example, the mapping information may be retrieved from a local or remote storage (e.g., schema data store 160 of FIG. 1).

At step 340, the subqueries are grouped into batch requests based on providers. For example, the mapping information may be used to determine which providers are associated with entities requested in each subquery. Subqueries that can be directed to a single provider are then grouped into a batch request to the single provider. In some embodiments, batch requests, may be authorized before they are dispatched to providers.

At step 350, the batch requests are sent to the providers. The providers may receive the batch requests and, in some embodiments after authorizing the batch requests, respond with the entities requested in the batch requests, At step 360, responses from the providers are received and aggregated into a single response to be sent to the client device. The client device may receive the response and use the entities that are included in the response as requested. For example, an application on the client device may populate one or more screens for display using the entities received in the response.

Figure 4:
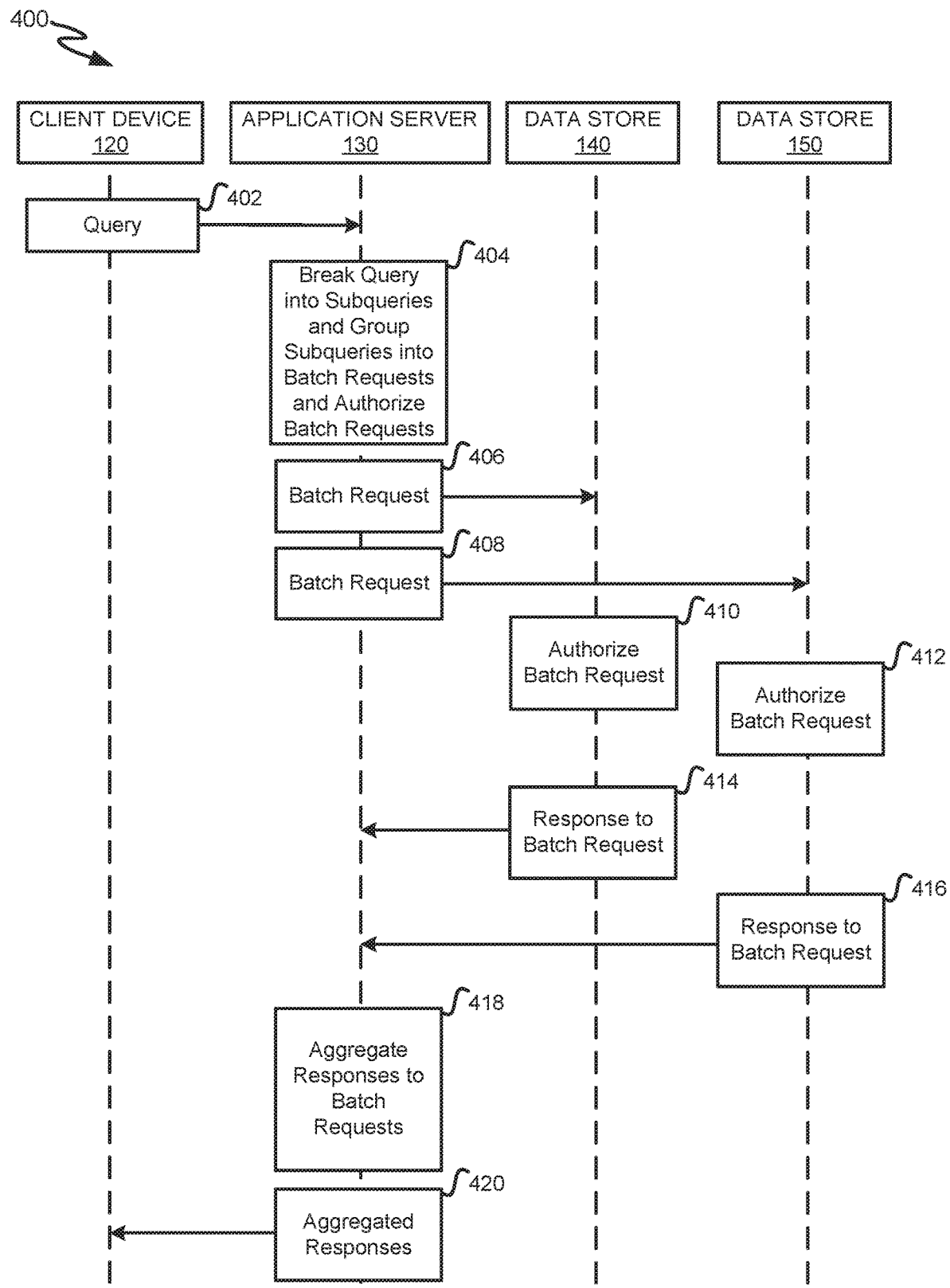
FIG. 4 depicts an example message flow between components related to optimizing request dispatching.

FIG. 4 depicts an example 400 of messages exchanged between various components of FIG. 1, including client device 120, application server 130, data store 140, and data store 150, related to optimizing message dispatching.

At 402, client device 120 sends a query to application server 130. The query may comprise a request for a plurality of entities (e.g., items of data) related to an application running on client device 120.

At 404 application server 130 breaks the query into a plurality of subqueries, each subquery corresponding to an entity included in the query, groups the subqueries into batch requests according to techniques described herein (e.g., using mapping information to identify providers for each entity and grouping all subqueries to a single provider into a batch request to the single provider), and authorizes each batch request (e.g., by using a certificate included in the query to ensure that a user, the application, and/or client device 120 is authorized to access the provider and/or the entities requested). In example 400, data store 140 is the provider associated with one group of entities included in a batch request and data store 150 is the provider associated with another group of entities included in a batch request. Application server 130 authorizes the batch request to data store 140 once and the batch request to data store 150 once rather than authorizing each individual subquery to these providers separately.

At 406, application server 130 dispatches a batch request to data store 140, and, at 408, application server 130 dispatches a batch request to data store 150. Application server 130 may include the certificate from the query in each batch request.

At 410, data store 140 authorizes the batch request sent at 406. At 412, data store 150 authorizes the batch request sent at 408. Data stores 140 and 150 may authorize the batch requests based, for example, on the certificate (e.g., by ensuring that a user, the application, and/or client device 120 is authorized to access the provider and/or the entities requested).

At 414, data store 140 responds to the batch request sent by application server 130 at 406 with the entities requested in the batch request. At 416, data store 150 responds to the batch request sent by application server 130 at 408 with the entities requested in the batch request.

At 418, application server 130 aggregates the responses it receives from data stores 140 and 150 into a single response. The responses may be aggregated so that they may be dispatched together in response to the client device.

At 420, application server 130 responds to the query sent by client device 120 at 402 with the single response comprising the aggregated responses. For example, the single response may include all of the entities requested by client device 120 in the query sent at 402. Client device 120 may receive the single response and use the entities as needed. For example, an application running on client device may use the entities to populate fields for display to a user.

It is noted that the example depicted in FIG. 4 and described herein is merely one example of techniques that may be implemented according to embodiments of the present disclosure. Other embodiments and messages may be employed consistent with the present disclosure.

Figure 5:
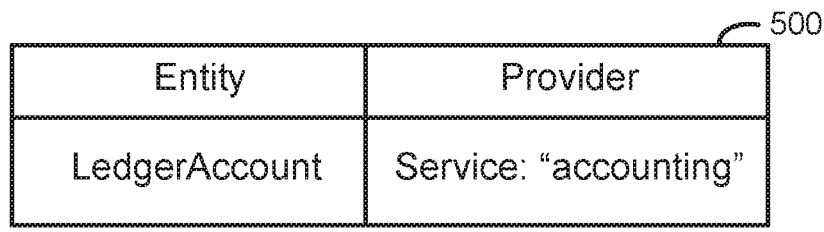
FIG. 5 depicts an example of mapping information between an entity and a provider.

FIG. 5 illustrates an example of mapping information 500.

Mapping information 500 includes a mapping between an entity, which is identified by the name "LedgerAccount", and a provider, which is hosted in a service named "accounting". Mapping information 500 may, in some embodiments be included within a graph representation of the API, which comprises schema definitions that represent functions exposed by the API. For example, mapping information 500 may be included within API schema data 162 of schema data store 160 in FIG. 1, which may store mapping information for a plurality of entities provided within the API.

Mapping information 500 may be used to identify a provider that is associated with the entity named "LedgerAccount" (which, in this case, is hosted in a service named "accounting"). For example, mapping information 500 may be used in processes for batching requests based on providers, as described with respect to FIGS. 1-4. Mapping information associated with each entity that is requested may be retrieved and used to determine providers for each entity so that batch requests may be generated.

Figure 6:
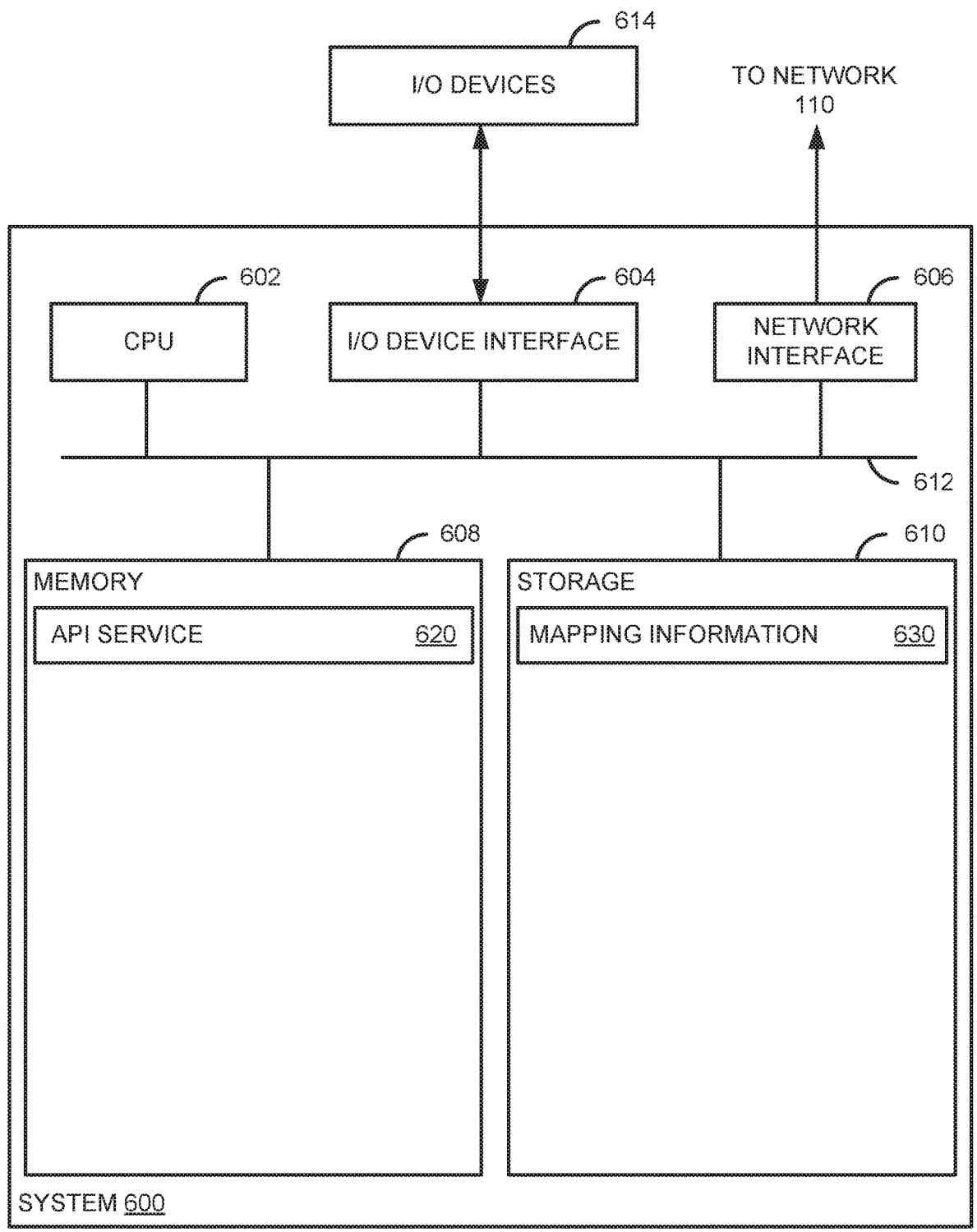
FIG. 6 depicts an example computing system with which embodiments of the present disclosure may be implemented.

FIG. 6 illustrates an example computer system 600 used for optimizing request dispatching between services, according to embodiments of the present disclosure. For example, computer system 600 may be representative of application server 130 in FIG. 1. As shown, the system 600 includes a central processing unit (CPU) 602, one or more I/O device interfaces 604 that may allow for the connection of various I/O devices 614 (e.g., keyboards, displays, mouse devices, pen input, etc.) to the system 600, network interface 606, a memory 608, storage 610, and an interconnect 612.

CPU 602 may retrieve and execute programming instructions stored in the memory 608. Similarly, CPU 602 may retrieve and store application data residing in memory 608. Interconnect 612 transmits programming instructions and application data, among CPU 602, I/O device interface 604, network interface 606, memory 608, and storage 610. CPU 602 is included to be representative of a single CPU, multiple CPUs, a single CPU having multiple processing cores, and the like. Additionally, memory 608 is included to be representative of a random access memory.

As shown, memory 608 includes an API service 620, which may perform operations related to optimizing request dispatching between services (e.g., functionality described above with respect to FIGS. 1-5). For example, API service 620 may receive a query from a client device, and may break the query into subqueries and group the subqueries into batch requests based on providers. API service 620 in memory 608 may communicate with other devices (e.g., clients and data stores) over a network through network interface 606 (e.g., in order to receive queries, access mapping and authentication information, send batch requests, receive responses, and send responses).

Furthermore, the storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN). As shown, storage 610 comprises mapping information 630, which may comprise associations between entities and providers. In some embodiments, API service 620 in memory 608 may access mapping information 630 in storage 610 in order to identify providers that are associated with entities that requested in queries received from client devices. In other embodiments, mapping information may be stored in a separate data store that is accessed over network 110 via network interface 606.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for requesting data in a distributed system, comprising:
   receiving at a server a query from an application running on a client device for a plurality of entities;
   generating a plurality of subqueries based on the query, wherein each subquery corresponds to an entity of the plurality of entities that is requested in the query;
   determining based on mapping information between the plurality of entities and a plurality of providers:
      a first group of subqueries of the plurality of subqueries corresponds to a first provider of the plurality of providers, wherein the first group of subqueries includes at least one read request and at least one write request; and
      a second group of subqueries of the plurality of subqueries corresponds to a second provider of the plurality of providers;
   generating a first batch request to the first provider of the plurality of providers and a second batch request to the second provider of the plurality of providers, wherein each batch request includes:
      the corresponding group of subqueries, and
      a certificate authorizing access to the first provider and the second provider of the plurality of providers;
   sending the first batch request from the server to the first provider of the plurality of providers;
   sending the second batch request from the server to the second provider of the plurality of providers;
   receiving particular entities from the first provider and the second provider of the plurality of providers in response to the first batch request and the second batch request;
   generating an aggregated response based on the received particular entities; and
   providing the aggregated response to the application.

2. The computer-implemented method of claim 1, wherein the method further comprises:
   analyzing the mapping information in order to identify a provider that correspond to a particular entity; and
   determining, based on the analyzing, that the particular entity is provided by the identified provider.

3. The computer-implemented method of claim 1, wherein, prior to sending each batch request, the method further comprises: authorizing each batch request by verifying that the application is authorized to access the corresponding provider.

4. The computer-implemented method of claim 1, wherein each batch request is generated by: creating a single HTTP request that is directed to the corresponding provider and comprises a request for each of the particular entities corresponding to the group of subqueries.

5. The computer-implemented method of claim 1, further comprising: launching a container thread, wherein the container thread sends each batch request to the corresponding provider and receives the particular entities from the corresponding provider in response to each batch request.

6. A system comprising: a processor; and a non-transitory computer-readable medium storing instructions that, when executed by the processor, cause the processor to perform a method for requesting data in a distributed system, the method comprising:
   receiving at a server a query from an application running on a client device for a plurality of entities;
   generating a plurality of subqueries based on the query, wherein each subquery corresponds to an entity of the plurality of entities that is requested in the query;
   determining based on mapping information between the plurality of entities and a plurality of providers:
      a first group of subqueries of the plurality of subqueries corresponds to a first provider of the plurality of providers, wherein the first group of subqueries includes at least one read request and at least one write request; and
      a second group of subqueries of the plurality of subqueries corresponds to a second provider of the plurality of providers;
   generating a first batch request to the first provider of the plurality of providers and a second batch request to the second provider of the plurality of providers, wherein each batch request includes:
      the corresponding group of subqueries, and
      a certificate authorizing access to the first provider and the second provider of the plurality of providers;
   sending the first batch request from the server to the first provider of the plurality of providers;
   sending the second batch request from the server to the second provider of the plurality of providers;
   receiving particular entities from the first provider and the second provider of the plurality of providers in response to the first batch request and the second batch request;
   generating an aggregated response based on the received particular entities; and
   providing the aggregated response to the application.

7. The system of claim 6, wherein the method further comprises:
   analyzing the mapping information in order to identify a provider that correspond to a particular entity; and
   determining, based on the analyzing, that the particular entity is provided by the identified provider.

8. The system of claim 6, wherein, prior to sending each batch request, the method further comprises: authorizing each batch request by verifying that the application is authorized to access the corresponding provider.

9. The system of claim 6, wherein each batch request is generated by: creating a single HTTP request that is directed to the corresponding provider and comprises a request for each of the particular entities corresponding to the group of subqueries.

10. The system of claim 6, wherein the method further comprises: launching a container thread, wherein the container thread sends each batch request to the corresponding provider and receives the particular entities from the corresponding provider in response to each batch request.

11. A non-transitory computer-readable medium storing instructions that, when executed by a processor, cause the processor to perform an operation for requesting data in a distributed system, the operation comprising:

receiving at a server a query from an application running on a client device for a plurality of entities;
generating a plurality of subqueries based on the query, wherein each subquery corresponds to an entity of the plurality of entities that is requested in the query;
determining based on mapping information between the plurality entities and a plurality of providers:
  a first group of subqueries of the plurality of subqueries corresponds to a first provider of the plurality of providers, wherein the first group of subqueries includes at least one read request and at least one write request; and
  a second group of subqueries of the plurality of subqueries corresponds to a second provider of the plurality of providers;
generating a first batch request to the first provider of the plurality of providers and a second batch request to the second provider of the plurality of providers, wherein each batch request includes:
  the corresponding group of subqueries, and
  a certificate authorizing access to the first provider and the second provider of the plurality of providers;
sending the first batch request from the server to the first provider of the plurality of providers;
sending the second batch request from the server to the second provider of the plurality of providers;
receiving particular entities from the first provider and the second provider of the plurality of providers in response to the first batch request and the second batch request;
generating an aggregated response based on the received particular entities; and
providing the aggregated response to the application.

12. The non-transitory computer-readable medium of claim 11, wherein the operation further comprises:
  analyzing the mapping information in order to identify a provider that correspond to a particular entity; and
  determining, based on the analyzing, that the particular entity is provided by the identified provider.

13. The non-transitory computer-readable medium of claim 11, wherein, prior to sending each batch request, the operation further comprises: authorizing each batch request by verifying that the application is authorized to access the corresponding provider.

14. The non-transitory computer-readable medium of claim 11, wherein each batch request is generated by: creating a single HTTP request that is directed to the corresponding provider and comprises a request for each of the particular entities corresponding to the group of subqueries.

15. The non-transitory computer-readable medium of claim 11, wherein the operation further comprises: launching a container thread, wherein the container thread sends each batch request to the corresponding provider and receives the particular entities from the corresponding provider in response to each batch request.

16. The method of claim 1, further comprising:
  determining a third group of subqueries of the plurality of subqueries corresponds to a third provider of the plurality of providers; and
  generating a third batch request to the third provider of the plurality of providers.

17. The method of claim 16, further comprising:
  determining the third batch request is not authorized to access the third provider of the plurality of providers; and
  sending an error notification to the application.

18. The system of claim 6, wherein the method further comprises:
  determining a third group of subqueries of the plurality of subqueries corresponds to a third provider of the plurality of providers; and
  generating a third batch request to the third provider of the plurality of providers.

19. The system of claim 18, wherein the method further comprises:
  determining the third batch request is not authorized to access the third provider of the plurality of providers; and
  sending an error notification to the application.

20. The non-transitory computer-readable medium of claim 11, wherein the operation further comprises:
  determining a third group of subqueries of the plurality of subqueries corresponds to a third provider of the plurality of providers; and
  generating a third batch request to the third provider of the plurality of providers.

21. The non-transitory computer-readable medium of claim 20, wherein the operation further comprises:
  determining the third batch request is not authorized to access the third provider of the plurality of providers; and
  sending an error notification to the application.

* * * * *